United States Patent [19]

Dischert et al.

[11] Patent Number: 4,556,906
[45] Date of Patent: Dec. 3, 1985

[54] KINESCOPE BLANKING SCHEME FOR WIDE-ASPECT RATIO TELEVISION

[75] Inventors: Robert A. Dischert, Burlington, N.J.; William H. Meise, Wrightstown, Pa.

[73] Assignee: RCA Corporation, Princeton, N.J.

[21] Appl. No.: 551,918

[22] Filed: Nov. 15, 1983

[51] Int. Cl.⁴ .................. H04N 5/223; H01J 29/70; H01J 29/80
[52] U.S. Cl. .................... 358/180; 315/395; 313/402; 313/403
[58] Field of Search .................. 358/87, 180, 22, 214, 358/216, 250; 315/395; 313/402, 403, 478, 474; 340/723, 724, 734

[56] References Cited

U.S. PATENT DOCUMENTS

| | | | |
|---|---|---|---|
| 3,097,262 | 7/1963 | Ehrenhaft | 358/180 |
| 3,908,083 | 9/1975 | Hiraki et al. | 178/7.5 R |
| 4,028,726 | 6/1977 | Argy | 358/165 |
| 4,385,324 | 5/1983 | Shioda et al. | 358/180 |

FOREIGN PATENT DOCUMENTS 57-206178 12/1982 Japan.

OTHER PUBLICATIONS

U.S. patent application Ser. No. 350,088 (Meise et al.) filed Feb. 18, 1982.

Primary Examiner—Michael A. Masinick
Assistant Examiner—E. Anne Toth
Attorney, Agent, or Firm—P. J. Rasmussen; P. M. Emanuel; R. G. Coalter

[57] ABSTRACT

A wide-angle television system, such as one having 2:1 or 5:3 aspect ratios, provides N portions that exceed the limits of a conventional 4:3 aspect ratio picture in regions that are normally hidden from view in a conventional receiver. Further, a receiver is provided wherein the picture is changed from the wide-angle display to the standard display by collapsing the horizontal scanning only. In another arrangement standard definition kinescopes having aspect ratios of 4:3 are masked in a special manner to provide a 5:3 aspect ratio display which may be collapsed to provide a 4:3 standard aspect ratio pictures.

3 Claims, 6 Drawing Figures

KINESCOPE BLANKING SCHEME FOR WIDE-ASPECT RATIO TELEVISION

The present invention relates to wide-screen television systems and, more particularly, to such systems that are compatible with conventional television receivers.

BACKGROUND OF THE INVENTION

A conventional television receiver has a nominal 4:3 aspect ratio (the ratio of width to height). Recently, there has been interest in using wider aspect ratios for television systems, such as 2:1 or 5:3, which more nearly approximate or equal the aspect ratio of the human eye than does the conventional 4:3 ratio. The 5:3 aspect ratio has received particular attention since release prints for motion picture film in the United States use this ratio, and thus can be transmitted and received without cropping. However, wide-screen television systems which simply transmit signals having an increased aspect ratio as compared with conventional systems are incompatible with conventional aspect ratio receivers. This makes widespread adoption of wide-screen systems difficult. It is, therefore, desirable to have a wide-screen television system that is compatible with conventional television receivers. In accordance with the principles of the present invention a wide-screen television system is provided that is compatible with conventional television receivers.

This compatability allows a viewer to display a 4:3 aspect ratio picture on a conventional receiver without modifying the conventional receiver. On the other hand, the viewer who desires to receive and display the wide angle television signals will have to have a new receiver. It is desirable that a new receiver capable of displaying wide angle pictures be multi-purpose, that is, capable of receiving and displaying both standard and wide aspect ratio signals. Initially receiver manufacturers may not wish to invest in special tooling and equipment to produce wide-angle kinescopes.

It has been suggested to fully scan a standard definition, 4:3 aspect ratio, kinescope when a standard definition television picture is displayed and to collapse the vertical deflection somewhat to display the wide-angle picture when available. This scheme, while logical, means that the customer (viewer) buying an expensive multi-function receiver displays the "better" wide-angle picture on a display smaller than on the standard definition display. Psychologically, the customer is spending more but getting less.

In accordance with one aspect of the present invention, a special wide-angle receiver is equipped with a standard 4:3 aspect ratio kinescope which is permanently masked to provide a wide-angle display. The new receiver has a wide-angle aspect ratio viewing area for displaying wide-angle pictures. In this mode of operation the viewing area of the wide-angle display is fully scanned during presentation of wide-angle pictures. On the other hand, when a standard definition, 4:3, picture is being viewed, the horizontal deflection (and only the horizontal deflection) is collapsed thereby displaying a standard definition 4:3 aspect ratio picture on an area smaller than the full width of the wide-angle display. Consequently, when the viewer views a wide-angle picture in the wide-angle mode he sees more picture than in the standard-definition mode.

SUMMARY OF THE INVENTION

In accordance with another aspect of the present invention a television display apparatus is adapted for displaying a horizontal-to-vertical aspect ratio picture that varies from a first aspect ratio to a second aspect ratio. The apparatus includes an image display means such as a cathode ray tube for displaying a picture received by the display apparatus in accordance with the aspect ratio of the received picture. The cathode ray tube has a face plate having a horizontal-to-vertical aspect ratio of 4:3. A modifying means is provided for masking a portion of the face plate of the cathode ray tube such that an active picture display area is provided on the face plate. The active picture display area has a second aspect ratio wherein the second aspect ratio is greater than the first aspect ratio and further the modifying means masks a greater portion of the cathode ray tube means in a vertical direction of the face plate than in a horizontal direction of the face plate. The apparatus further includes selecting means for selecting between the first and second aspect ratios for displaying the picture received in accordance with the aspect ratio of the received picture on the face plate in the active picture display area. Picture size control means, coupled to the selecting means, affects the display apparatus such that the size of the display is changed in a horizontal direction in response to the selecting means.

DETAILED DESCRIPTION

Figure 1:
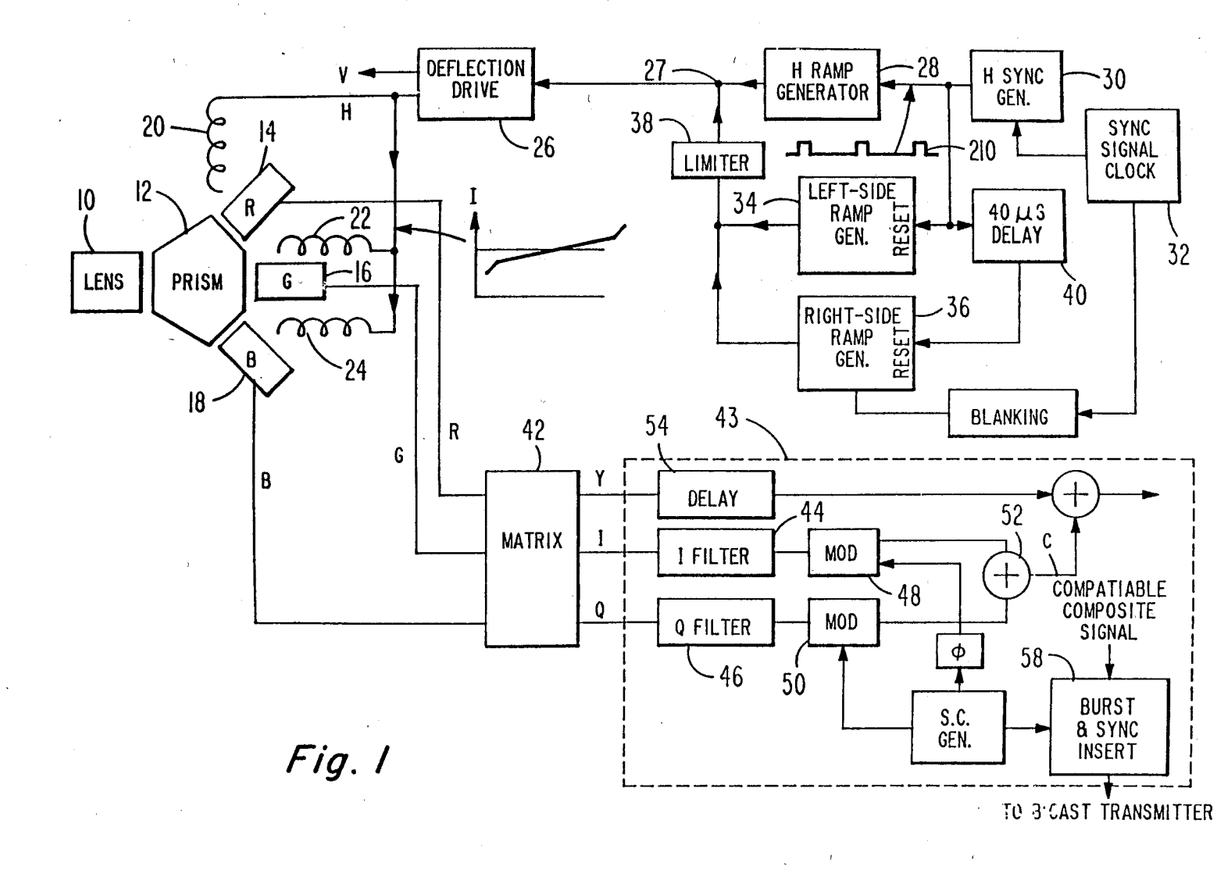
FIG. 1 is a block diagram of a portion of a transmitter in accordance with a first embodiment of the invention.

FIG. 1 illustrates a source of color television signals in which the deflection rate of a camera is varied in such a fashion as to produce a time-compressed signal. In FIG. 1, a lens 10 focuses light from an image (not shown) through a prism 12 onto red (R), green (G), and blue (B) vidicons 14, 16 and 18, respectively. Horizontal deflection windings 20, 22, and 24 are associated with vidicons 14, 16 and 18, respectively, for driving the beams horizontally. Vertical deflection is provided by vertical deflection windings (not shown). A deflection drive circuit illustrated as a block 26 drives the vertical and horizontal deflection windings. The horizontal deflection windings are illustrated as being driven in parallel, but they may also be driven in series. The deflection drive is driven in part from a horizontal ramp generator 28 which generates a recurrent horizontal-rate current or voltage waveform by which deflection drive 26 is driven. Horizontal ramp generator 28 is synchronized by recurrent horizontal synchronizing pulses 210 produced by horizontal sync signal generator 30 which in turn is synchronized from the sync signal clock generator 32.

In order to generate a video signal which is at the normal rate in the center of the raster and which is time compressed at the edges of the raster, the rate of the ramp applied to deflection drive 26 must exceed the rate of the ramp produced by horizontal ramp generator 28 at least part of the time. For this purpose, additional circuitry including a left-side ramp generator 34 is provided. Left-side ramp generator 34 is reset by the horizontal sync pulse from horizontal sync pulse generator 30 at the same time at which horizontal ramp generator 28 is reset. Both ramp generators begin to ramp at the same time. The ramp generated by left-side ramp generator 34 is added at a junction point 27 to the ramp produced by generator 28. A limiter 38 is coupled to left-side ramp generator 34 to limit its signal after a short period of time. When the signal is limited, the ramp produced by generator 34 can no longer affect the ramp generated by ramp generator 28.

Figure 2:
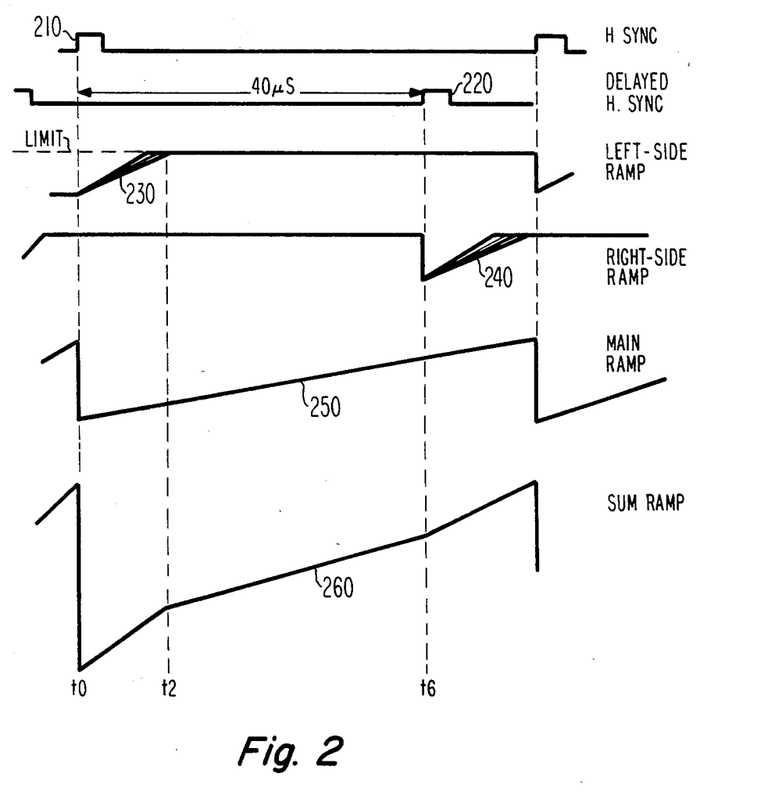
FIG. 2 is a waveform diagram useful in explaining the operation of FIG. 1.

Right-side ramp generator 36 is enabled by a pulse generated by a delay circuit 40 which in turn is triggered by horizontal sync generator 30. Thus, the main ramp generator 28 and the left-side ramp generator 34 are triggered simultaneously, at time t0 by horizontal sync pulse 210, to produce a linear main ramp signal 250 (FIG. 2) from ramp generator 28 and a left-side ramp signal 230 from ramp generator 34. These ramps have generally different ramp rates and amplitudes. Left-side ramp 230 ramps upward until a time t2, at which time it reaches a limit value at which limiter 38 takes effect. At a later time, t1 in the example given, 40 µS after H sync, the H sync delayed by delay generator 40 resets right-side ramp generator 36 and sets it to ramping. Generator 36 has a ramp rate and amplitude similar to that of generator 34, and the ramp 240 which is produced reaches a limit at or near the time of the next following H sync pulse. The three ramps 230, 240 and 250 are added either by voltage addition in an adder (not shown) or by generating the ramp signals as currents which can be added by simply summing as illustrated in FIG. 1. The resultant ramp 260 has a slow ramp rate near the center of the raster (between times t2 and t6) and a more rapid ramp rate near the right and left extremes.

These summed ramps when applied to deflection drive 26 cause the imagers 14, 16 and 18 to scan more quickly near the right and left extremes compared with the central portion of the raster. The resulting video is time-compressed at the edges of the raster. A time compression of about 2:1 is required for 5:3/4:3 aspect ratio conversion, so the rate of the sum ramp 260 between t0 and t2 and between t6 and t0 should be about twice the center-raster rate.

The normal active H scan time for 525-line, 60 Hz signals such as NTSC signals is about 53 µS, corresponding to the "4" portion of a 4:3 aspect ratio. The commensurate duration of the "5" portions of a 5:3 aspect ratio would be 5/4 times 53 µS or about 66 µS. Since about 40 µS at the center of each raster remains unchanged there is effectively more video remaining in the 5:3 raster outside of the 40 µS central portion than there is video in the 4:3 raster which is outside the 40 µS central portion. The 5:3 raster has 66 µS−40 µS=26 µS of effective video, which must be inserted into the difference between 53 µS and 40 µS, which is 13 µS. Thus, 26 µS of effective time duration of 5:3 video must be compressed into 13 µS in the 4:3 raster, which is a time or raster compression of 2:1 at the right and left extremes of the raster.

The time compression of the video by the increased scan rate near the edges of the scanned raster increases the frequency of resulting video over that which it would have with scanning at the same rate as at the center. At least parts of the increased frequency signal will be cut off by the bandwidth limitations of the transmitter through which the signal is ultimately transmitted, and the loss will show up at the receiver display as a loss in resolution of the time-compressed portions. This loss of resolution is not generally important, however, it is like the loss of resolution in TV cameras and color kinescopes near the scan extremes where misconvergence and deflection nonlinearities are present.

The R, G and B video signals produced by tubes 14, 16 and 18 are applied to a matrix 42 in which Y, I and Q signals are generated. The I and Q signals are applied through bandwidth-limiting I and Q filters 44 and 46 to individual amplitude modulators 48 and 50 for modulation onto mutually quadrature carriers, in known fashion. The modulated I and Q signals are added in an adder 52, and the added C signals are summed with a luminance signal that has been passed through an equalizing delay 54. This produces a compatible composite signal which is applied to a burst and sync inserter illustrated as a block 58, where sync, burst, blanking and the like are inserted. The signal may then be processed, as by recording, but ultimately is broadcast either over the airwaves or by cable to receivers.

Two types of receivers are possible; conventional relatively narrow-angle 4:3 aspect ratio or special 5:3 aspect ratio receivers according to the invention. Naturally, the special receivers may be arranged to display standard 4:3 aspect ratio when compatible composite wide-angle signals are not being broadcast. The standard 4:3 receiver receives the compatible wide-angle signal and simply displays it together with its nonlinearity. Since the nonlinearity is at the right and left extremes of the raster, the principal portion of the compressed video is hidden from view by the overscan. Overscan on commercial receivers is typically 10% on each side, or a total of 20%. The compressed portion of the compatible wide-angle signal is 13 µS out of 53 µS, which is about 20%. Thus, most of the compressed signal is hidden.

The point at which time-compression begins may appear as a vertical line near the right and left extremes of a receiver displaying signals in which the right and left edges are time-compressed. Concealment is aided by changing over between the time-compressed video and uncompressed video in a gradual manner. At the encoder of FIG. 1, this is accomplished by low-pass filtering the additional left and right extreme ramp signals before adding them to the principal ramp signal. The rounded ramp edges produced by filtering in turn increase the time required for the transition between time-compression and non-compression.

Figure 3:
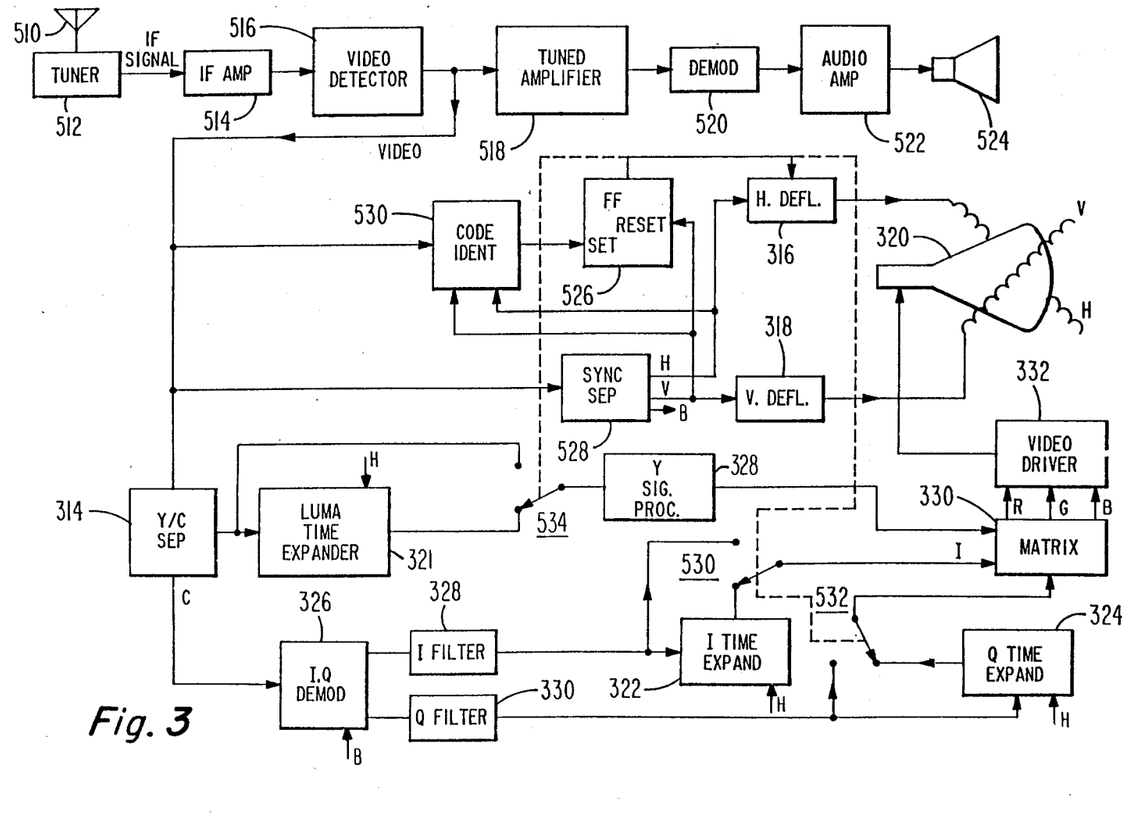
FIG. 3 is a block diagram of a portion of a receiver used for receiving signals transmitted by the transmitter of FIG. 1.

The arrangement of FIG. 3 illustrates a television receiver adapted for receiving broadcast signals and for displaying standard 4:3 aspect ratio pictures or wide angle 5:3 pictures. This receiver includes an antenna 510 coupled to a tuner 512 which selects the desired channel, amplifies and down-converts the signal to an intermediate frequency (IF). An IF amplifier 514 further amplifies the IF signal and applies it to a detector 516 to form baseband composite video and intercarrier sound signals, in known manner. The sound signal is coupled through a tuned amplifier 518 to an FM demodulator 520 which produces an audio signal, which in turn is amplified by an amplifier 522 and applied to a loudspeaker 524. The composite video is applied to sync and burst separator 528 and to a luminance-chrominance (Y/C) separator 314.

Horizontal and vertical sync signals are extracted from the composite video and applied to horizontal and vertical deflection circuits 316 and 318, respectively, for synchronizing the deflection of the electron beams of a kinescope 320 with an amplitude to form a 5:3 raster (a 4:3 raster is formed by reducing the horizontal deflection). Horizontal sync is also applied from separator 528 to Y, I and Q time expanders 321, 322 and 324, respectively, for synchronizing the operation of the expanders with the incoming signal. Separated luminance signal is applied to a time expander 321 from the Y output terminal of luminance-chrominance separator 314. The modulated chrominance signal is applied from separator 314 to I and Q demodulators illustrated as a block 326 which receives for this purpose separated burst signal from separator 528 by a path, (not shown). The demodulated I and Q signals are applied by way of I and Q switching-signal suppressing filters 328 and 330, respectively, to corresponding I and Q expanders 322 and 324. The time expanders time-expand the signals at the right and left extremes of the raster in a manner offsetting the time compression operation performed at the encoder of FIG. 1. For an illustration of time expanders 321, 322 and 324 reference may be made to copending patent application Ser. No. 350,088 filed on Feb. 18, 1982 in the name of Meise et al. The subject matter of patent application Ser. No. 350,088 is hereby incorporated by reference. The partially time-expanded signals from luminance expander 321 are applied to further luminance-signal processing circuits illustrated as a block 328, which may include noise suppression, gamma correction, time delays, and the like ordinarily used for television display. The processed luminance signal is applied to a matrix 330, together with the partially time-expanded I and Q signals from expanders 322 and 324, where the signals are linearly added to produce red, green and blue signals which are applied to video amplifiers illustrated as a block 332. The amplified R, G and B signals are applied to kinescope 320. Due to the operation of time expanders 321, 322 and 324, the video signals have the same time characteristics over the duration of each horizontal line, and undistorted video is displayed on the 5:3 raster.

Since the standard signals have a different aspect ratio, the aspect ratio of the displayed raster must also be changed by reducing the raster width when standard signals are to be displayed. The receiver of FIG. 3 includes a flip-flop (FF) 526 which operates switches coupled to the various portions of the receiver for changing the picture aspect ratio and for disabling the time expansion. FF 526 is reset during each vertical sync interval by a vertical sync pulse from a sync separator 528 to operate the switches for receipt of standard-type signals. A unique coded signal is transmitted within the compatible composite signal during that portion of the vertical blanking interval following the sync signal when compatible wide-angle composite signals are being transmitted. A code detector 530 detects the presence of the coded signal and produces a pulse which is applied to set FF 526. Thus, the receiver adapts itself to either a standard 4:3 aspect ratio signal or to a 5:3 aspect ratio signal. Code detector 530 may include a counter, a detector and a comparator. Assuming that the unique pulse identifying the wide aspect ratio signal is present on a line of the vertical blanking interval, the counter would start counting lines after the vertical interval starts. When the line carrying the unique identification signal is reached the detector would be enabled to detect the presence of the unique signal. The output of the detector is compared to a sequence level in the comparator. Thus the output of the comparator is provided to enable flip flop 526. In another embodiment code identifier 530 could be replaced by a user activated switch. During transmission of wide angle signals the user switch would be activated to set FF 526.

An output of FF 526 is applied to an input of horizontal deflection circuit 316 in the SET condition corresponding to the reception of compatible composite wideband signals. The SET signal applied to horizontal deflection 316 controls the deflection width. Control of the deflection width is well known and can be accomplished, for example, by controlling the energizing voltage of the horizontal output stage FIG. 6. Thus, during the transmission of compatible wide-angle signals, the SET output signal of FF 526 increases the horizontal deflection width to form a wide-angle or 5:3 raster, thereby increasing the electron beam current density at the right and left extremes of the viewable area. For a 4:3 raster the electron beam current density is reduced (effectively to zero) at the right and left extremes of the viewable area.

In the arrangement of FIG. 3, a switch 530 is coupled to both the input and the output of I time expander 322 for selecting either the input or the output signal as an input signal to matrix 330. Similarly, a switch 532 couples the another input of matrix 330 to either the input or the output of Q time expander 324. Also, switch 534 couples the luminance signal input of matrix 330 to either the input or the output of Luma time expander 321. Switches 530, 532 and 534 are controlled by the condition of FF 526. In the reset state, which corresponds to the transmission of standard signals, switches 530, 532 and 534 select for the respective inputs of matrix 330 signals unmodified by expanders 322, 324 and 321. In the SET condition of FF 526, switches 530, 532 and 534 switch to the alternate position as shown, so that the I, Q and Y signals applied to matrix 330 pass through expanders 322, 324 and 321 respectively.

In the embodiment of FIG. 1 the arrangement produces a wide-angle signal and time-compresses the right and left extremes of the signal to accommodate wide-angle information within a standard or narrow-angle signal format. The arrangement of FIG. 3 shows receivers adapted to receive and process a signal encoded by the arrangement of FIG. 1.

In accordance with the aforementioned Meise et al. patent application a compatible wide-angle signal may be provided in different ways. For example, the left and right-side information in excess of the standard 4:3 format may be concealed within the vertical blanking interval (VBI).

Figure 4:
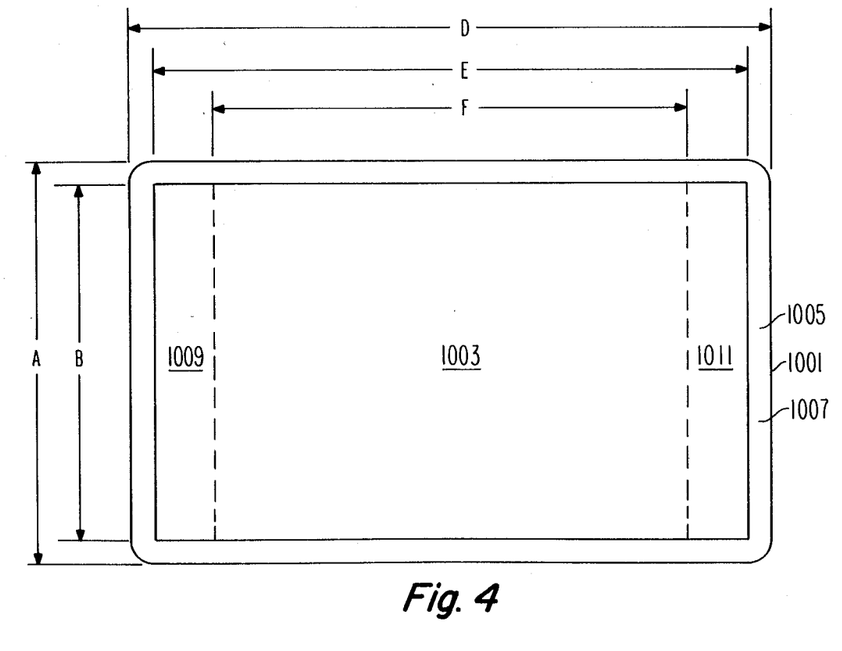
FIG. 4 is a front view of a kinescope having an image area in accordance with the principles of the present invention.

FIG. 4 shows details of the face plate of one embodiment of kinescope 320 of FIG. 3 in accordance with the principles of the present invention. Face plate 1001 is provided with an aspect ratio D:A (illustratively, in a wide aspect ratio system the face plate may have an aspect ratio of 5:3). Face plate 1001 is provided with an active display area 1003 defined by the rectangle within E, B. In a receiver the nonactive area (or boundary) 1005 may be covered with a bezel or mask 1007. In accordance with the arrangement of FIG. 4 a wide-angle television picture is displayed within the boundary indicated by E, B to provide an aspect ratio E:B which is substantially equal to the aspect ratio of D:A of the kinescope face plate. On the other hand, when a standard definition picture is displayed on the face plate 1001 the picture is displayed within the area bounded by rectangle F, B with the edges 1009 and 1011 unscanned or blanked (the aspect ratio of the standard definition would illustratively be 4:3).

Figure 5:
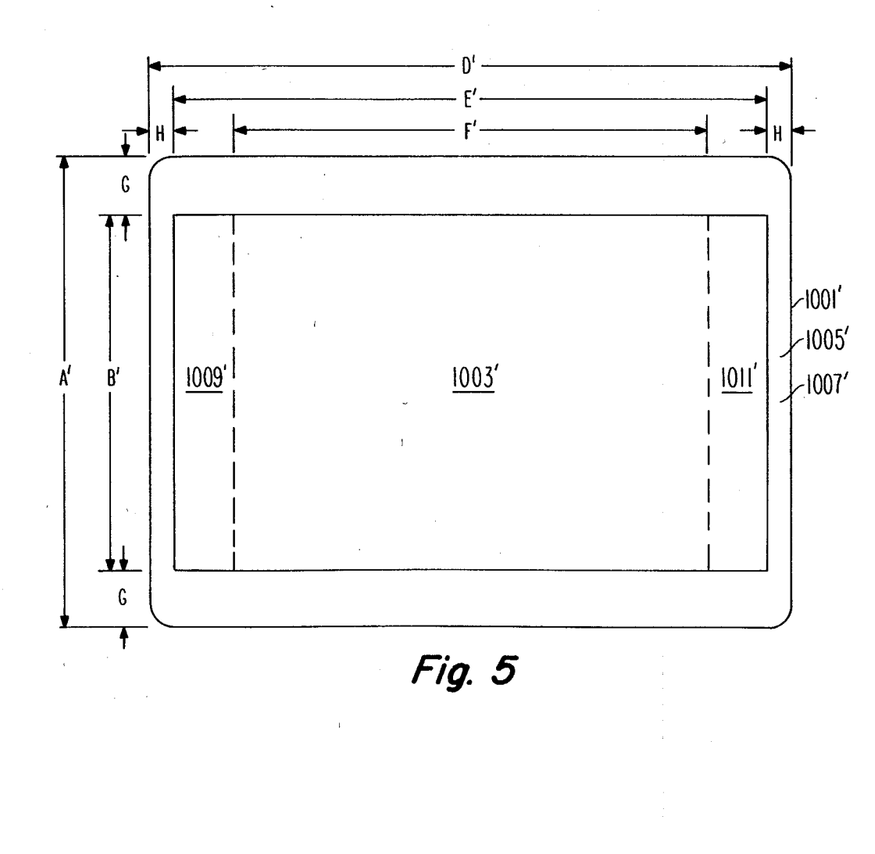
FIG. 5 is a front view of another kinescope having an image area in accordance with the principles of the present invention.

FIG. 5 shows another arrangement of the face plate of kinescope 320 of FIG. 3 in accordance with an aspect of the present invention. In FIG. 5 face plate 1001' includes an active image area 1003'. In the FIG. 5 arrangement a mask 1007' is provided for masking off the nonactive portion 1005' of face plate 1001'. In accordance with this embodiment the face plate aspect ratio D':A' is different from the aspect ratio for the wide angle screen, i.e., E':B'. As noted above, it may be desirable to provide a wide-angle display area on a standard 4:3 aspect ratio kinescope. Thus, in accordance with this embodiment, a standard 4:3 kinescope is provided with mask 1007' where G (vertical masking) is substantially greater than the H (horizontal masking). Thus the kinescope of FIG. 5 has a wide aspect ratio D':B' formed on a standard kinescope having an aspect ratio D':A'. On this display standard definition picture is displayed in the rectangle F', B' by reducing the horizontal scan to eliminate scanning the active display area 1003' in the areas 1009' and 1011'. In accordance with this arrangement the viewer gets more picture in the wide-angle mode than in the standard definition mode, as opposed to an arrangement in which the kinescope face is more fully utilized.

Figure 6:
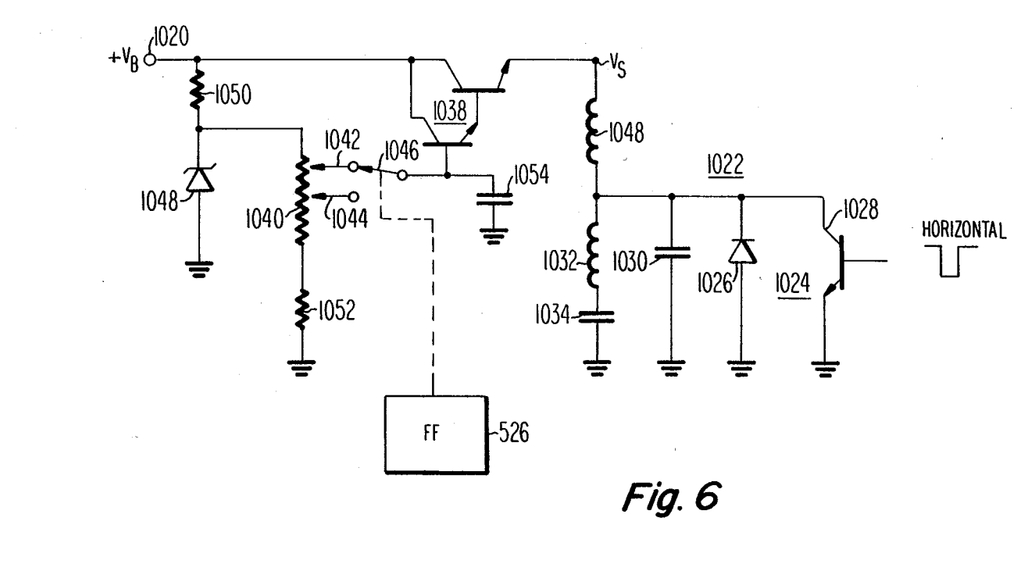
FIG. 6 is a circuit diagram of a horizontal deflection circuit in accordance with an embodiment of the invention.

FIG. 6 illustrates an embodiment for the horizontal deflection 316 of FIG. 3. In accordance with the embodiment of FIG. 6 the receiver is provided with means for adapting itself to either a standard aspect ratio (illustratively, 4:3) or to a wide-angle aspect ratio (illustratively, 5:3) signal. In this arrangement, a source of voltage $V_B$ is provided at terminal 1020 to a horizontal deflection circuit 1022 which comprises a deflection trace switch 1024 including damper diode 1026 and horizontal output transistor 1028 which is switched at the horizontal rate, a horizontal retrace capacitor 1030, and a series coupled arrangement of a horizontal deflection winding 1032 and a capacitor 1034. In accordance with the circuit a saw-tooth current is provided through horizontal deflection winding 1032. The amplitude of the saw-tooth current is proportional to the source voltage $V_S$. Thus changing the source voltage $V_S$ affects the scan width of the electron beam in the horizontal direction. The base voltage on Darlington-connected transistor 1038 is made variable for varying the source voltage $V_S$ from a first value to a second. The variation is accomplished by switching the base of transistor 1038 between two taps 1042, 1044 on a voltage divider dividing a voltage regulated by a zener diode 1048. The voltage selected is determined by the positioning of switch 1046 which is controlled by the state of flip flop 526, as suggested by the dotted connection. A capacitor 1054 coupled to the base of transistor 1038 aids in controlling power-supply ripple and in reducing turn-on and voltage-switching transients. Flip flop 526 operates to change switch 1046 responsive to the unique coded signal when compatible wide-angle signals are being transmitted. It would be apparent to one of skill in the art that the switch 1046 may be implemented by using a solid state device such as an MOS transistor. To obtain supply voltage $V_S$, capacitor 1034 is coupled to the transistor 1038 through inductor 1048.

In operation the average or DC value of capacitor 1034 is substantially equal to the supply voltage $V_S$. During the horizontal retrace interval, with trace switch 1024 cut-off, horizontal deflection winding 1032 and horizontal retrace capacitor 1034 resonate for one-half cycle of oscillation.

Other embodiments of the invention fall within the scope of the present claims. For example, instead of varying the width of the horizontal trace (deflection) in a cathode ray tube or switching between wide and standard definition displays one may wish to blank horizontal portions of a wide-angle display to provide a standard definition display having a 4:3 active display area. Such a scheme would require the use of storage elements and time compressors to provide the standard display within the wide screen display by blanking (i.e., varying the intensity of the electron beam when scanning the left and right extremes of the viewable portion of the display when viewing scenes of varying aspect ratio). It should also be noted that the masking as shown in FIG. 5 need not be done as shown specifically in the FIGURE but may be slightly modified. For example, rather than providing equal masking on the top and bottom of the display it may be desirable to provide all of the masking at either the top or the bottom of the display.

We claim:

1. A direct view television display apparatus adapted for displaying a horizontal-to-vertical aspect ratio picture that varies from a first aspect ratio of 4:3 to a second aspect ratio greater than 4:3, comprising:

image display means for displaying a picture received by said display apparatus in accordance with the aspect ratio of said received picture, said image display means comprising a direct view cathode ray tube means having a face plate having a horizontal-to-vertical aspect ratio of 4:3;

masking means for masking a top portion, a bottom portion and two side portions of said face plate of said cathode ray tube means such that an active picture display area is provided on said face plate when viewed through said masking means, said active picture display area having vertical and horizontal dimensions corresponding to said second aspect ratio, wherein said second aspect ratio is greater than said first aspect ratio, said masking means masking a greater portion of said cathode ray tube means in a vertical direction of said face plate than in a horizontal direction of said face plate;

selecting means for selecting between said first and said second aspect ratio for displaying said picture received in accordance with the aspect ratio of said received picture on said face plate in said active picture display area; and picture size control means, coupled to said selecting means for affecting said display apparatus such that the size of the display is changed in a horizontal direction in response to said selecting means.

2. A television display apparatus adapted for displaying images of scenes having disparate aspect ratios, comprising:

a direct view cathode ray tube having a face plate with a horizontal-to-vertical aspect ratio of 4:3 whereby full utilization of the height of said cathode ray tube face plate for display of said 4:3 aspect ratio scenes requires that the effective height of the displayed image be reduced when displaying images having an aspect ratio greater than 4:3, which in turn produces the undesirable psychological effect of reducing the displayed picture area in high-aspect-ratio modes of operation;

masking means for masking the top, bottom and sides of said face plate for reducing the available display height for increasing the aspect ratio of the viewable portion of said face plate; and controllable means for varying the size of the picture as viewed through said masking means by varying the horizontal dimension of said picture whereby a 4:3 aspect ratio scene is viewed with a particular height and a given horizontal dimension, and a higher aspect-ratio picture is viewed with said particular height and a larger horizontal dimension whereby the picture becomes larger when viewing a wide aspect ratio scene and said undesirable psychological effect is avoided.

3. A television display apparatus according to claim 2 wherein said controllable means further comprises means for varying the electron beam intensity impinging upon the left and right extremes of said viewable portion of said cathode ray tube when viewing scenes of varying aspect ratios.

* * * * *